No. 803,678. PATENTED NOV. 7, 1905.
W. L. R. EMMET.
TURBINE.
APPLICATION FILED MAY 12, 1902. RENEWED APR. 6, 1904.

Witnesses:
Marcus L. Byng.
Alex F. Macdonald.

Inventor:
William L. R. Emmet
by Albert G. Davis
Att'y

No. 803,678. PATENTED NOV. 7, 1905.
W. L. R. EMMET.
TURBINE.
APPLICATION FILED MAY 12, 1902. RENEWED APR. 6, 1904.

Witnesses:
Marcus B. Byng.
Alex F. Macdonald.

Inventor:
William L. R. Emmet,
by Albert G. Davis
Att'y

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

TURBINE.

No. 803,678.  Specification of Letters Patent.  Patented Nov. 7, 1905.

Application filed May 12, 1902. Renewed April 6, 1904. Serial No. 201,912.

*To all whom it may concern:*

Be it known that I, WILLIAM L. R. EMMET, a citizen of the United States, residing at Schenectady, in the county of Schenectady, State of New York, have invented certain new and useful Improvements in Turbines, of which the following is a specification.

The present invention has for its object to improve and simplify the construction of elastic-fluid turbines and also to make them more efficient.

In carrying out my invention the shaft is mounted in a vertical position, and rigidly attached thereto are the bucket-wheels and also the revolving member of a dynamo-electric machine. The vertical arrangement is highly advantageous in that the tendency of the shaft to spring and cause the wheel-buckets to rub on the stationary parts is overcome, this being a common fault in horizontal machines. It also overcomes the difficulty experienced in horizontal machines in loading the several bearings evenly. The shaft and bearings can also be made shorter for a given-size machine, because the weight is supported by a step or thrust bearing, the other bearing or bearings merely acting as guides which do not carry weight. In other words, the pressure is removed from all of the bearings except the step or thrust bearing. With a horizontal arrangement the diameter of the shaft has to be kept as small as possible owing to bearing difficulties, whereas with the vertical arrangement the shaft can be made as large as desired. Where a shaft occupies a horizontal position and carries a heavy weight, the bearings have to be very long in order to present the necessary surfaces. Hence the shaft has to be increased in length correspondingly. The difficulties are further increased by the fact that all of the bearings have to be supplied with lubricant under pressure. With a horizontal machine having a heavy rotating member if the supply of lubricant fails, due to accident, the shaft, as well as the bearing, is usually badly cut and scored. In event of such a thing happening with my improved arrangement the worst that can happen is the defacement of the surfaces of the two cast-iron bearing-blocks, which can readily be replaced. The vertical construction is also advantageous in that there is less distortion of the casing, due to expansion and contraction, because it is supported at all points instead of being limited to two points, as in a horizontal arrangement. In other words, the expansion is symmetrical. This arrangement further has the advantage that for a given-size machine it occupies less floor-space and there is a corresponding reduction in the cost of the foundations. Owing to the arrangement of the parts, there is always a definite relation between the positions of the rotary and stationary elements. The wheels are mounted close together, and the last wheel is situated within a short distance of the step-bearing. Hence the relation of parts is little changed by expansion and contraction. and the thrust is always in the same direction. The step-bearing, which supports the entire weight of the moving structure, is located inside of the chambered base of the machine, which chamber is subjected to the influence of a condenser. The bearing is adjustable from a point outside of the casing, and lubricant is supplied to the bearing under such a pressure as will maintain a film between the bearing-blocks. The lubricant exhausting from the step-bearing passes to a guide-bearing, from which it is withdrawn by a suitable conduit. The upper guide-bearings are lubricated by separate low-pressure means. Inclosing the bearings is a casing which prevents the lubricant, such as oil, from mingling with the exhaust. This arrangement is highly advantageous, since it permits of the condensed steam or other fluid being returned directly to the boiler or vaporizer without first passing it through a separator. The ordinary steam-engine practice is to let the water issuing from the condenser go to waste. So far as I am aware there is no separator which will effectively separate oil and water, and the result is that attempts to return the condensed steam to the boiler have been at the expense of the latter. Mounted on top of the chambered base is a cylindrical casing for the wheels of the turbine, which is divided into stages by suitable separators, the latter extending between the surrounding casing and the shaft. By using a cylindrical construction for the casing and mounting it on end I obtain a maximum amount of strength with a minimum amount of metal and weight. It also facilitates machining, since all of the finished surfaces are surfaces of revolution. The casing is divided into sections to facilitate the construction and also the assembling. The stages are mounted one above the other, with the high-pressure stage at the top, which has an important bearing on the economy and at the same time facilitates the removal of water given up by the expanding motive fluid. The temperature of the water in one stage is considerably higher than that in the succeeding stage. Hence in passing from one stage to another the water gives up its heat, and the energy thus produced performs useful work. Owing to the passage of the water in a downward direction, all tendency for the water to fall back on the surfaces of higher temperatures is obviated. The supply-valves for the stages are mounted in chests that are carried by the wheel-casing. Motive fluid from the supply-valves is delivered to nozzles, which in turn discharge it in an axial direction at the proper angle and velocity to the wheel-buckets, the latter abstracting the said velocity fractionally. Between the rows of buckets on the wheel and supported by the casing are intermediate buckets, which receive motive fluid from one row of buckets and after reversing its direction discharge it against the adjacent row of buckets at the proper angle. Situated above the wheel-casing and supported thereby is the cylindrical frame or casing of the dynamo-electric machine or generator to which the stationary element of the machine is attached. In the present embodiment the armature is the stationary element and the field the revolving element, the latter being rigidly attached to the wheel-shaft. It will thus be seen that the inclosing casing of the turbine acts as a support for the generator, thereby dispensing with the bed or frame piece, which is necessary with a horizontal arrangement of parts. The parts of the turbo-generator being arranged in sections and mounted one above the other, the structure as a whole can be readily assembled or taken down.

It is well known that in a horizontal machine the weight of the shaft alone will produce a slight deflection, which cannot be avoided, and this in itself will produce vibration when the parts are running. With the shaft in the vertical position there is no deflection, resulting in the most stable running condition. This absence of vibration permits of a reduction in the size and weight of the foundation, with a corresponding decrease in cost. The wear is confined to inexpensive parts which are easily replaced. Supported by the dynamo-frame are guide-bearings for the wheel-shaft.

By combining and arranging the parts as set forth I am able to produce a turbine of low shaft speed which weighs less, has fewer and simpler parts, higher economy, and less cost than prior existing machines.

In the accompanying drawings, which illustrate an embodiment of my invention,
Figure 1 is a side view of a turbine and a generator with a quarter-section removed.
Fig. 4 is a horizontal section of the machine, showing the relation of the stationary and moving buckets.
Fig. 5 is a sectional detail showing the bucket construction of the moving element.
Fig. 6 is a segmental view of a part of the revolving wheel, taken in a plane at right angles to the shaft.

In the drawings, 1 represents the base, and formed therein is a vacuum-chamber 2, which communicates with a condenser by two outlets 3 and 4. The base is made in two parts for convenience of construction, and the line of division is at right angles to the plane of the base. At the point of union the parts of the base are provided with flanges 5, and these flanges are united by bolts 6. A packing between these flanges may be employed, if desired. In the lower part of the base is a raised portion 7, forming a support for the lower or step bearing, the said support being divided, one portion being carried by one half of the base and the other part by the other half of the base. The construction of the self-centering step-bearing will be referred to hereinafter. The upper end of the base is circular and is provided with an outwardly-extending flange 8 and a rabbet or bead 9. The flange and rabbet may with advantage be faced in a boring-mill and when so faced are ready to receive the stationary ring-like portion or casing 10 of the second stage of the turbine or the first stage where only one stage is employed. The casing 10 is secured to the base at suitable intervals by the bolts 11. The casing 10 is provided with a number of openings, which are equally spaced around the circumference, and each of these openings is designed to receive a set of stationary buckets 12. The buckets are carried on a support 13, and the latter is bolted to the casing. The number of rows of buckets in each section depends upon the number of rows on the wheels. In the present instance three are shown. The upper end of the ring or casing is faced off true, and mounted thereon is a disk 14. The disk is provided with a small shoulder 15, which engages with the inner surface of the casing and is centered thereby. The disk is also provided with a number of projections 16, extending at right angles thereto. These projections are hollow and are arranged to receive the groups of nozzles 17. The number of the projections and the number of sets of nozzles correspond to that of the stationary or intermediate sets of buckets. In other words, for every set of stationary buckets there is a projection and a set of nozzles. The disk is provided with a hub at the center, and radiating therefrom are ribs 18. The hub is perforated centrally to receive the shaft of the turbine, the said shaft making a loose fit therewith. Mounted on the hub is a sleeve 19, which closely encircles the shaft and reduces the loss by escaping steam to a minimum. The sleeve may be arranged to slide on the hub of the disk, or it may be rigidly secured thereto. The construction of the disk is such that it can be machined on a boring-mill, thus reducing the cost to a minimum. Mounted in each one of the projections is a set of nozzles 17, which nozzles may be formed separately or out of a single piece. In the latter case a flange 20 is provided, which rests on the top of the projection.

Figures 4, 5, 6:
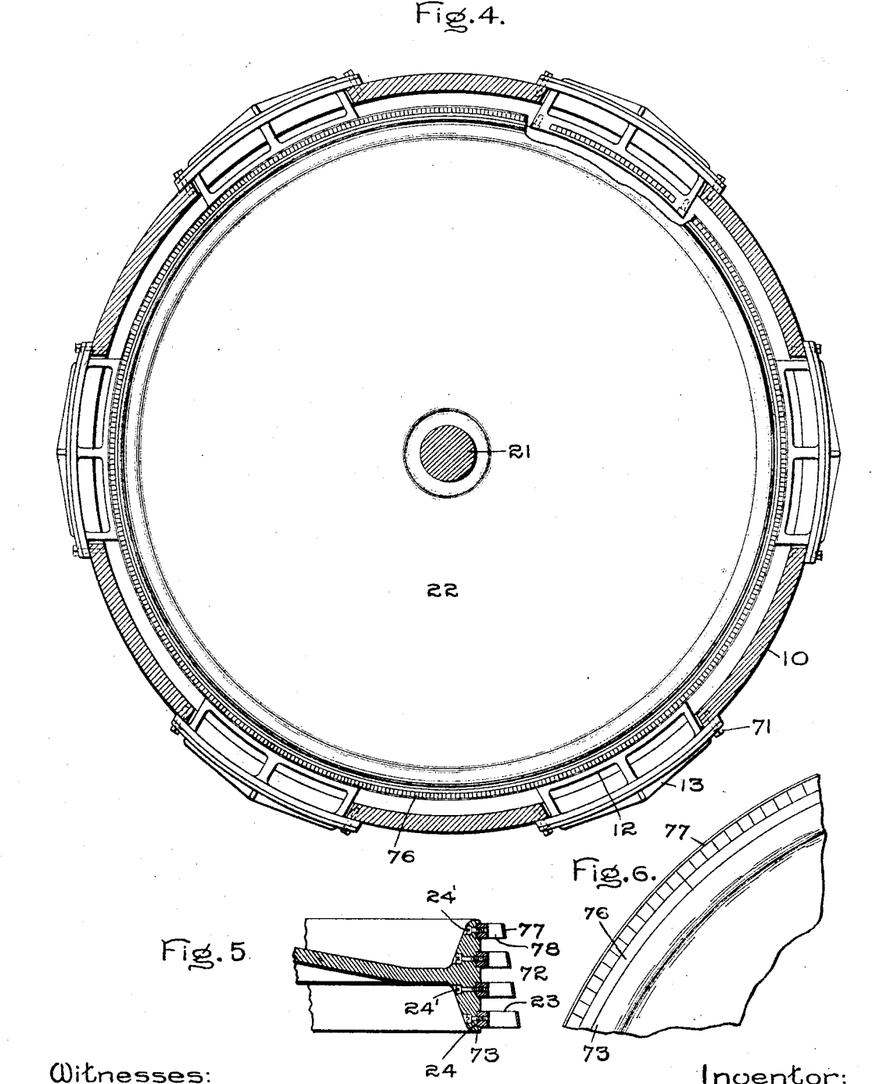

Rigidly mounted on the main shaft 21 is the rotating element or wheel 22 of the second stage of the turbine. This element comprises a wheel having a downwardly-extending hub which surrounds the shaft and rests on a shoulder formed thereon and a rim arranged to receive the buckets. The buckets 23, Figs. 5 and 6, are cut out of segmental pieces of metal, and these pieces are mounted on the rim of the wheel, preferably in grooves 24, to hold them in alinement, and retained by bolts 24'. In the present instance four sets or rows of buckets are shown; but the number can be modified as desired to suit different conditions and other forms of retaining means can be employed. The main body of the wheel 22 being located in close proximity to the disk decreases the volume of the chamber between them and also makes the structure as a whole compact. The buckets freely discharge the motive fluid into the vacuum-chamber formed in the base, and from this point it passes to a condenser. By the arrangement described ample space is provided for the motive fluid, and there is no choking back due to an accumulation of the fluid which would take place if the passage was restricted. Again, by having the wheel in direct communication with the chamber the use of a diaphragm or partition is obviated.

Mounted on each of the projections on the disk is a vertical valve-containing standard or support 26, and these standards are employed to support the first stage of the turbine. The standards are secured to the projections by bolts 27, and the same bolts pass through the flanges on the nozzles or the pieces containing the nozzles and hold them in place. These same bolts may be employed to assist in holding the upper disk and ring or casing together. The upper end of each of the standards is reduced in size and is provided with a flange which is bolted to the under side of the casing for the first stage. In addition to acting as a support for the first stage the vertically-extending standards are employed to convey steam or other elastic motive fluid from one stage to the other, in this manner reducing the number of parts. The standards are chambered out, and the upper end thereof is somewhat smaller than the bottom. The object of the chambers is to collect all of the fluid from the buckets of the first stage, form it into as many streams as there are standards, and deliver it to the groups of nozzles of the second stage, the second-stage nozzles reconverting the pressure into *vis viva*, which is fractionally abstracted by the moving buckets or vanes. The standards are also provided with valves 79 for regulating the passage of the motive fluid through the nozzles.

The casing for the first stage is composed of three principal parts. The under part comprises a disk-like portion 28, having a downturned hub at the center and a flange at the periphery, which contains a plurality of openings 29 for conveying the motive fluid from the buckets to the chambers or passages within the standards. Radiating from the center of the under part are a plurality of ribs employed to strengthen the structure. The under surface of the peripheral flange is bolted to the vertical standards 26. The lower portion of the first-stage casing is supported at the center by a tubular stand or support 30, the lower end of which rests on the hub of the disk 14 and is bolted thereto. The second or intermediate part of the first-stage casing comprises a ring 31, having a plurality of openings arranged to receive the intermediate or stationary buckets 32. There are as many of these openings as there are sets of first-stage nozzles. The ring 31 has finished faces at the top and bottom and also at certain points on the periphery, the latter being for the purpose of receiving the supports for the stationary or intermediate buckets 32. These intermediate buckets are detachably secured to the ring by bolts. The same arrangement is employed in securing the intermediate buckets of the second stage. The ring is secured to the lower part of the casing by bolts or other equivalent means and is also secured to the upper part of the casing in the same manner. The third or upper part of the casing comprises a disk-like structure 33, having a thickened rim which is provided with a plurality of openings corresponding to the number of sets of nozzles or to the number of nozzles where they are arranged singly. By placing the disks in close proximity to the wheel the size of the machine as a whole can be reduced and ample space is provided for the strengthening-ribs. The rim is also provided with a small shoulder or bead 34, that serves to center it. The parts of the casing are simple in construction, and practically all of the machine-work thereon can be done on a boring-mill, thus simplifying the work and decreasing the cost of construction. Mounted within the first-stage casing is a wheel having a number of buckets of the desired character, and between these buckets are intermediates arranged in a suitable manner.

Mounted in the openings formed in the rim of the disk 33 are nozzles 35, which are preferably, although not necessarily, formed in a single piece, the object being to have them as close together as possible. Formed on the nozzle-containing piece or pieces is a flange 36, which is bolted to the upper surface of the disk-rim. Opening into the nozzle-containing structure are steam connections 37. The hub of the disk 33 is bored out to receive the main shaft and a sleeve 38. The latter closely surrounds the shaft and prevents the exit of motive fluid at that point. It will be seen that the disks 28 and 33, which form a part of the chamber, for the first stage are located in close proximity to the moving wheel, and in this manner reduce the size of its chamber to a minimum.

The upper face of the rim or flange of the disk 33 is faced off true to receive the frame 39 of the dynamo-electric machine. The dynamo-frame instead of being made as shown can be provided with a band or ring located between the first stage and the laminated structure. Extending inwardly at the base of the frame is a flange 40, and this is secured to the disk in the present instance by a number of bolts distributed at different points, as illustrated. The particular fastening means is immaterial so long as the parts are arranged in rigid relation and are capable of being assembled and taken down easily. The frame of the dynamo is cut away at 41 to permit access to the interior and also to the steam connections 37. The openings also afford an opportunity for the air to circulate. Formed on the interior of the frame and distributed at points substantially equidistant are projections 42, which support a steady bearing 43. The bearing comprises a sleeve, which makes a working fit with the main shaft, and a spider 44, having suitable strengthening-ribs. The spider is bolted at its edge to the projections 42, formed on the frame. Just below the steady bearing the shaft is provided with a downwardly-beveled collar, and surrounding this collar is an oil-receiving receptacle 45, which is bolted to the spider. The dynamo shown is of the revolving-field type; but the armature can be made to revolve and the field-magnet held stationary, if desired. The armature laminæ 46 have the necessary shape and characteristics and are held in place by suitable means, such as end clamps 47. Mounted on the laminæ is a winding 48, which is connected to the circuit in any suitable manner. The field-magnet comprises laminated pole-pieces 49 and a central hub 50, the latter being rigidly secured to the main shaft. The pole-pieces each have a winding 51, which is connected to the collector-ring 52 in a suitable manner. The dynamo-frame is provided with a finished upper surface, and mounted thereon is a two-part cover 53, having suitable ventilating-openings. The parts of the cover are provided with depending flanges 54, and these are bolted together. The cover is bored centrally to receive the steady bearing 57, and secured thereto at a point below the opening and the beveled collar on the shaft is an oil-catching receptacle 58. Surrounding the opening at the top is an oil-receiving receptacle 59.

The principal and self-adjusting bearing for the main shaft is located at the bottom and is entirely within the vacuum-chamber. This is an important feature of my invention, for it enables me to dispense with all packing on the machine for preventing impairment of the vacuum. With constructions previously used the shaft passed through the casing or casings containing the bucket or vane wheel, and it was necessary to provide suitable packing-rings or similar devices. When these are made tight enough to effectively prevent the entrance of air into the vacuum-chamber or the exit of steam from other parts of the machine, they are liable to wear out rapidly, and require lubrication, which may admit oil to the steam. It is very important to keep the lubricant out of the steam, and by the construction shown this is effectively done.

Referring to the construction of the main bearing, 7 represents a projection formed partly on one half of the casing of the vacuum-chamber and partly on the other. Surrounding the projection is a casing which prevents the lubricant from mingling with the exhaust and comprising two principal parts—an upper one, 60, and a lower one, 61. Between the shaft and the casing is a packing, which assists in preventing the lubricant and exhaust from mingling. The lower part is bolted to the casing and the upper part is bolted to the lower. The lower end of the shaft is shouldered and is also provided with a tapered end. The latter fits into an opening formed in the wearing-block 62 and is keyed thereto. Situated below the block is a bearing 63, and the bearing and block are both chambered out to form an oil-well 64, to which oil is fed under pressure. The under side of the bearing is curved to form a portion of a sphere, and this portion fits into an adjustable stationary disk or plate 65, having a curved surface or socket of similar character. The object of this arrangement is to provide a self-centering bearing which will compensate for inaccuracies in alinement. On the periphery of the disk or plate are projections 66, and these engage with corresponding projections 67, formed on or carried by the casing 61, the object being to prevent the parts from turning with respect to each other. Situated under the disk and extending outside of the casing is a plurality of adjusting-bolts 68, by means of which the revolving elements of the turbine can be adjusted vertically as desired A part of these bolts are carried by one half of the base and the remainder by the other half. By placing the bolts at different points around the bearing and extending them through the casing the bearing can be adjusted for wear without breaking any of the permanent connections or entering the casing itself.

Figure 1:
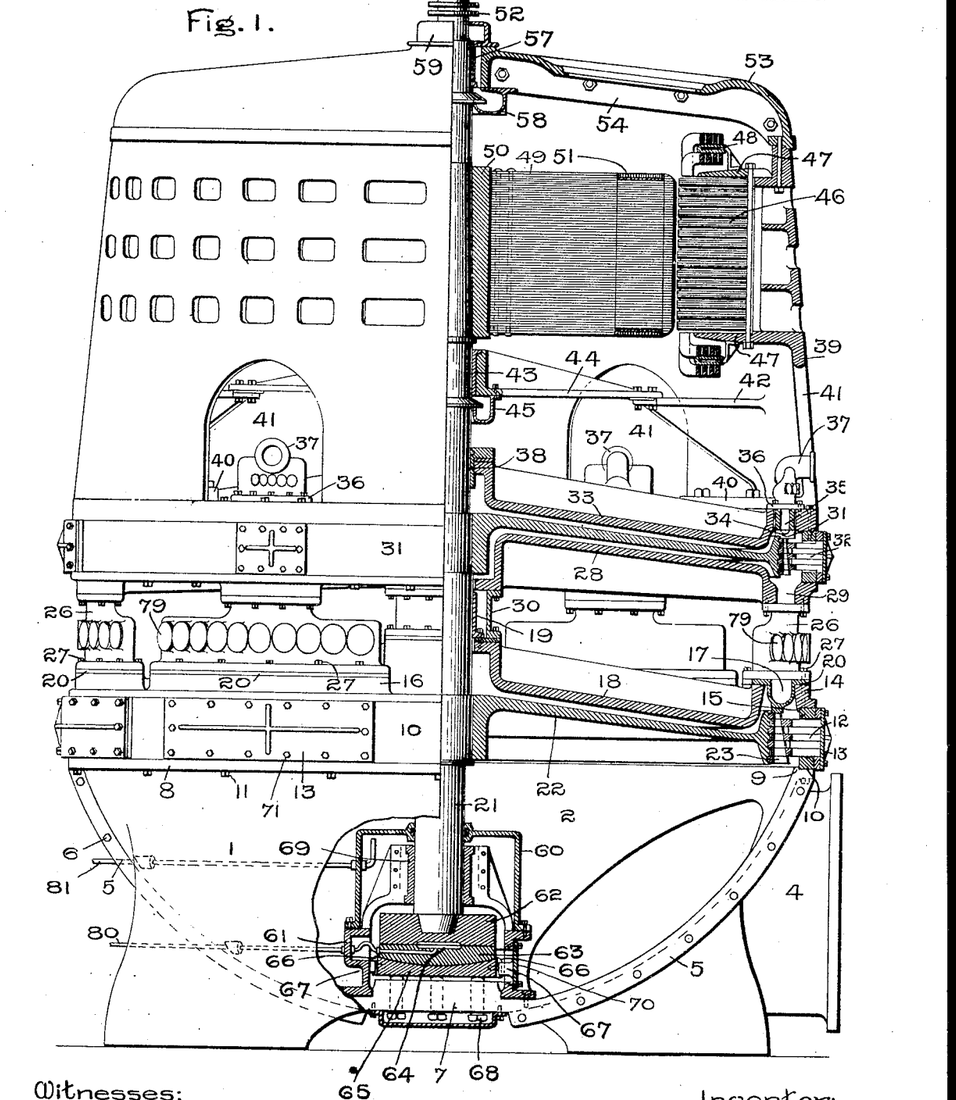
Figure 2:
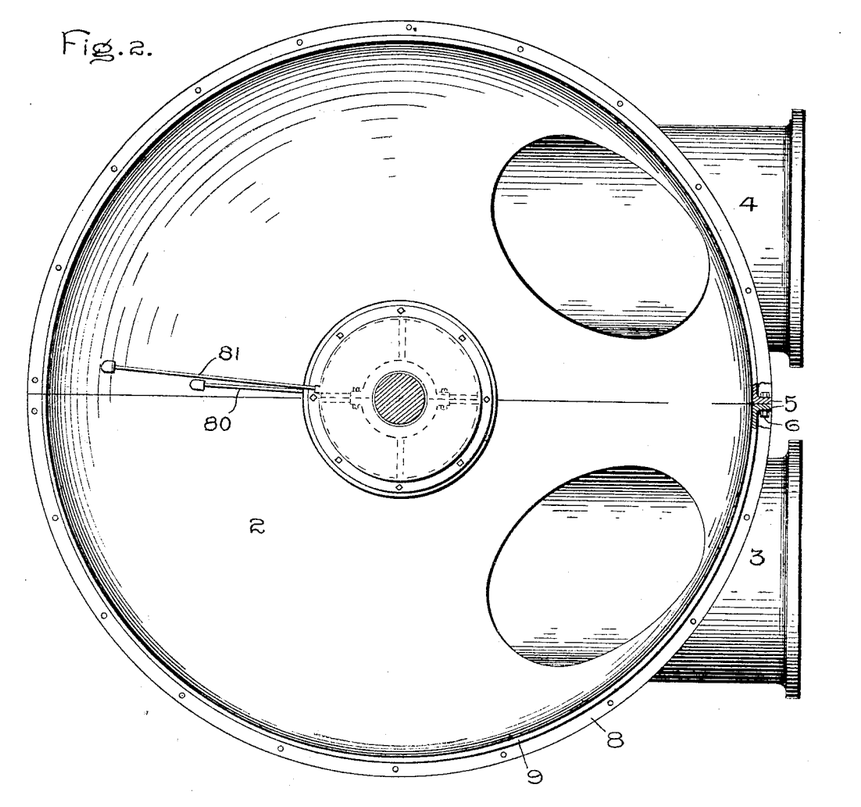
Fig. 2 is a plan view of the base of the turbine.
Figure 3:
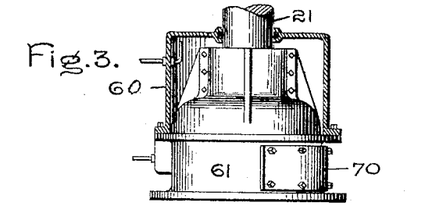
Fig. 3 is a view in elevation of the lower bearing, located within the vacuum-chamber.

Rigidly mounted on the lower half 61 of the bearing-casing is one half of the steady or guide bearing 69, and since the said part is prevented from lateral displacement by reason of the projection on the casing it follows that when the cap is secured to the bearing the main shaft will be held against lateral displacement. The drawings show the shaft as having three guide or steady bearings and one main bearing, the two kinds of bearings having their wearing-faces at right angles to each other. To get at the lowest steady bearing, the casing 60 is raised. The lower half of the casing is provided with an opening through which the lower or thrust bearing can be inspected. A cover 70, Figs. 1 and 3, is provided for the opening. In order to get at the lower bearing, the connection between the condenser and the vacuum-chamber is broken, after which a man can readily enter the chamber through one of the connections 4 or he may enter through an ordinary manhole. Oil is supplied to the lower bearing by the pipe 80, which delivers it to the space between the wearing-block 62 and the bearing 63. The oil spreads laterally in a thin film and fills the chamber formed in the casing 60. By this means the steady bearing 69 is also lubricated from the same source. A pipe 81 is employed to remove the excess of oil from the chamber formed in the casing 60. The lubricating arrangements are not claimed herein, but form the subject-matter of a separate application bearing Serial No. 162,524 and filed June 22, 1903.

In Fig. 4 the means for supporting the intermediates are clearly shown. The intermediates are distributed around the periphery of the ring or casing, preferably, although not necessarily, at equidistant points, and the plates which support them are secured to the ring by bolts 71 or other equivalent means. The intermediates comprise a number of vanes or buckets so arranged that a plurality of fluid-passages are provided, which passages are arranged to change the direction of flow of the fluid as it passes from one wheel to the next. The ends of the buckets are closed in by a cover.

The revolving elements of the turbine are provided with a number of rows of buckets 72, which rows are each composed of segmental pieces. In the present instance four rows are shown; but the number can be varied to suit the requirements. Each wheel is provided with a flange 73, Fig. 5, extending parallel with the axis, and in this flange are as many grooves 24 as there are rows of buckets. Mounted in the grooves and retained in place by bolts or screws 24' are detachable segmental bucket elements 76. The sides of the groove prevent lateral displacement of the bucket-sections; but other equivalent means may be employed. The segments are provided with integrally-formed buckets and in constructing are mounted on a suitable support, after which they are removed and mounted on the wheel in the manner shown. Each row of buckets is provided with a cover 77, and the fluid-passages 78, formed by the cover and buckets of the several rows, gradually increase in cross-sectional area toward the exhaust. It sometimes happens that it is necessary to remove one or more of the bucket-segments for the purpose of repair or otherwise. This can be accomplished by removing a set of nozzles and also one of the intermediates. A wrench can then be inserted through the nozzle-opening and the retaining-bolts removed, after which the segment can be taken out of the opening in the ring normally occupied by the intermediate. Instead of using a nozzle-opening in the disk its equivalent, a manhole, can be provided.

Figure 7:
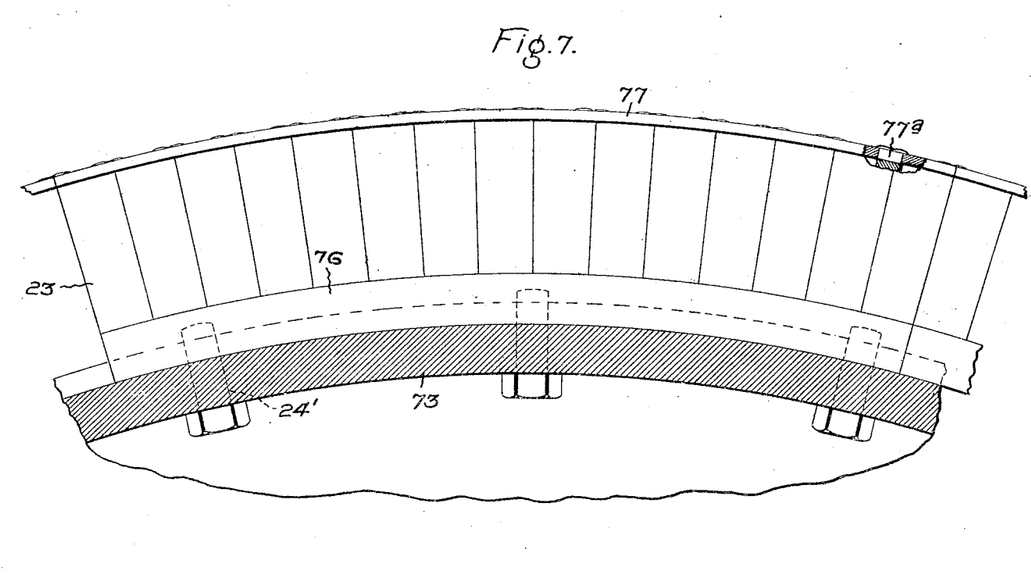
Fig. 7 is a detail view, on an enlarged scale, showing the construction of the buckets and their support.

In Fig. 7 are shown, on an enlarged scale, the removable bucket-segments, in which 73 represents a support, such as a wheel or carrier. The buckets 23 are formed integral with the segmental base-pieces 76, and the latter are arranged end to end. The buckets are provided with integral tenons $77^a$ for securing the segmental sections of the cover 77 in place. The segments of the cover are arranged end to end, with joints between them so positioned that the bucket-segments can be individually applied to and removed from their support for the purposes set forth.

Steam enters the first stage through the expanding nozzles, which convert a certain amount of the pressure into *vis viva* and deliver it to the rotating buckets and to the intermediates. After passing through the first stage and having all or a substantial amount of its velocity abstracted the steam from the casing or shell enters the standards and is conveyed by them to the second stage, thence through the valves 79 and second-stage expanding nozzles into the second-stage wheel and intermediates. The pressure remaining in the steam received from the first stage is further converted into velocity as it passes through the second-stage expansion-nozzles, and the velocity is fractionally abstracted by the buckets. The vacuum in the exhaust-chamber may be maintained in any suitable way.

The turbine illustrated is shown as being coupled directly to a dynamo; but it is obvious that it may be used for other power purposes. It should also be noted that while it is shown as a vertical machine many of the advantageous structural features would be of advantage in a horizontal machine, and the claims should be interpreted in this light.

The turbine shown is intended for large sizes—such as five thousand kilowatts, for example; but my invention is not limited to this, for larger or smaller turbines may be advantageously constructed on the lines set forth above, and I aim to embrace such constructions in the claims.

The vertical arrangement of parts presents many advantages over a horizontal arrangement, the principal of which is the symmetry of alinement due to expansion. By utilizing the vertical arrangement of parts I can reduce the clearance between stationary and moving buckets, because there is less distortion. This reduction in the clearance-spaces is most important, because the economy of the machine is directly affected.

The construction of the step-bearing in the base is not claimed herein, but forms the subject-matter of an application of myself and Oscar Junggren, Serial No. 163,060, filed June 25, 1903. I have described the step-bearing as working in a vacuum, as certain advantages follow therefrom; but I do not wish to be understood as limiting myself to this arrangement.

From the foregoing it is evident that the turbine described and illustrated is divided into stages and that each stage is provided with a bucket-wheel which is acted upon by the motive fluid discharged by the nozzle or nozzles. It is also evident that the wheels in the stages are compound, because they act more than once on the fluid stream in abstracting its velocity.

In accordance with the provisions of the patent statutes I have described the principle of operation of my invention, together with the apparatus which I now consider to represent the best embodiment thereof; but I desire to have it understood that the apparatus shown is only illustrative and that the invention may be carried out by other means.

What I claim as new, and desire to secure by Letters Patent of the United States, is—

1. In a compound elastic-fluid turbine, the combination of stages working at different pressures and arranged one above the other, with the high-pressure stage at the top, a row of wheel-buckets for each stage mounted on the same shaft, a nozzle or passage for delivering fluid to the high-pressure stage, a second nozzle or passage for delivering fluid to a stage of lower pressure, a single bearing which supports the weight of the moving parts, and a guide-bearing located adjacent to the first-mentioned bearing and within the wheel-casing.

2. In an elastic-fluid turbine, which is compounded by stages, the combination of stages working at different pressures and arranged one above the other, with the high-pressure stage at the top, a compound wheel for each stage, a nozzle attached to the head of the casing for delivering fluid to a portion only of the first stage, a second nozzle or passage for delivering fluid to a succeeding stage, a single bearing which sustains the weight of the moving parts, and a guide-bearing located adjacent to the first-mentioned bearing within the wheel-casing.

3. In an elastic-fluid turbine which is compounded by stages, the combination of stages working at different pressures and arranged one above the other with the high-pressure stage at the top, a wheel for each stage, a separator between adjacent wheels, a nozzle or discharge-passage which delivers high-pressure fluid to the first stage, a second nozzle or discharge-passage carried by the separator which receives fluid from the first stage and discharges it into a lower-pressure stage, the general direction of fluid-flow being downward, a dynamo-electric machine, a vertical shaft which is common to all the stages and the revolving element of the dynamo-electric machine, and a bearing which sustains the weight of the shaft and of the parts affixed thereto and extending into the wheel-casing.

4. In a turbo-generator, the combination of a base containing an enlarged chamber, a cylindrical wheel-casing mounted on the top of the base and inclosing the wheels, a frame for the generator, which rests on and is supported by the wheel-casing, a vertical shaft, a bearing for the shaft, supported by the base, bucket-wheels mounted on the shaft, and a revolving element for the generator, which is also carried by the shaft.

5. In a compound elastic-fluid turbine, the combination of horizontal bucket-wheels, a nozzle supported by the head of the casing which discharges motive fluid to a portion only of one of the bucket-wheels, a second nozzle carried by a separator which receives motive fluid from one wheel and delivers it to another wheel, a vertical shaft which carries the wheels, a casing which incloses the wheels, and horizontal separators that separate the wheels one from the other.

6. A compound elastic-fluid turbine wherein are combined two or more wheel-chambers arranged one above the other, a vertical shaft passing centrally through said wheel-chambers, two or more wheels mounted upon said shaft within said wheel-chambers, axial-flow buckets carried by said wheels, and two or more nozzles coöperating with and located in axial alinement with the buckets in the two or more wheel-chambers respectively and connected to receive the elastic fluid in succession, substantially as set forth.

7. A compound elastic-fluid turbine wherein are combined two or more wheel-chambers arranged one above the other, a vertical shaft passing centrally through said wheel-chambers, two or more wheels mounted upon said shaft within said wheel-chambers, two or more sets of axial-flow buckets carried by said wheels in each of said wheel-chambers, one or more sets of stationary intermediate buckets in each of said wheel-chambers, and two or more nozzles coöperating with and located in axial alinement with the buckets in the two or more wheel-chambers respectively and connected to receive the elastic fluid in succession, substantially as set forth.

8. In a compound elastic-fluid turbine, the combination of a nozzle located at the upper end of the machine which is supported by the head of the wheel-casing and arranged to discharge the motive fluid downwardly, two or more separate bucket-wheels situated one below the other, the high-pressure wheel being located at the top, a casing for the wheels, which contains an enlarged chamber at the bottom into which the low-pressure wheel discharges, a vertical shaft which carries the wheels, and a bearing for the shaft, that is carried by and extends into the casing.

9. In a compound elastic-fluid turbine, the combination of a nozzle or discharge-passage located at the upper end of the machine and arranged to discharge the motive fluid downwardly, two or more separate bucket-wheels situated one below the other, the high-pressure wheel being located at the top, a casing for the wheels, which contains an enlarged chamber at the bottom into which the low-pressure wheel discharges, a vertical shaft which carries the wheels, a dynamo-electric machine having its revolving element carried by the shaft, a bearing which sustains the weight of the wheels and the revolving element of the dynamo-electric machine and is itself supported by the casing, and a guide-bearing for the shaft located adjacent to the first-mentioned bearing and within the casing 10. In a compound elastic-fluid turbine, the combination of separate wheel-compartments arranged one above the other and working at different pressures, a compound wheel in each of the compartments, a nozzle or passage which discharges motive fluid to a portion only of the wheel in the high-pressure compartment, another nozzle carried by a separator between wheel-compartments which discharges motive fluid to a greater portion of a wheel in a compartment of lower pressure, the general direction of flow of the fluid being downward, a chambered base acting as a support for the casing forming the wheel-compartment into which the last wheel discharges, a vertical shaft which carries the wheels, a step-bearing for the shaft, which is located in and is supported by the chambered base, and a guide-bearing for the shaft also located within the chambered base.

11. In a compound elastic-fluid turbine, the combination of bucket-wheels arranged one above the other, a vertical shaft which carries the wheels, a cylindrical inclosing casing, separators between the wheels, extending from the casing to the shaft, nozzles or passages for discharging the motive fluid against the successive wheels in such manner that the general direction of flow is substantially parallel to the shaft, a dynamo-electric machine resting on the cylindrical casing and occupying a vertical position and having its revolving element mounted on the shaft, and a bearing which supports the weight of the shaft and parts affixed thereto, which is mounted on the casing.

12. In an elastic-fluid turbine, the combination of independent wheels, rows of buckets mounted on each wheel, one above the other, which are acted upon successively by the motive fluid, a cylindrical casing which incloses the buckets, nozzles or passages which are carried by the casing and discharge motive fluid in a downward direction against the buckets, a valve-chest for supplying the nozzles or passages, which is mounted on the casing, a vertical shaft which carries the wheels, and a step-bearing which is inclosed by the casing and supports the shaft, the said bearing being removable from the outside of the casing and acting to prevent the entrance of air or the escape of motive fluid at the point of support.

13. In an elastic-fluid turbine, the combination of circular rows of buckets arranged to be acted upon successively by the motive fluid, a casing which incloses the buckets, expanding nozzles which direct the motive fluid downward against the first row of buckets, other nozzles in line with the first, which receive fluid after it is discharged from the first row of buckets and direct it downward against another row, a separator between adjacent bucket-wheels extending from the shaft to a point beyond the periphery of the wheel and carrying nozzles, a dynamo-electric machine occupying the same vertical plane as the turbine, a vertical shaft which carries the rotating elements of the turbine and dynamo-electric machine, a bearing for the shaft, which supports the entire weight of the revolving structure, and a steady bearing located above the turbine and between it and the dynamo-electric machine.

14. In a turbine, the combination of a revolving element, a second casing therefor, a casing containing a chamber which receives the motive fluid after it is discharged from the revolving element, a bearing for supporting the said element, which is entirely within the chamber in the casing, and means for preventing the lubricant supplied to the bearing from mingling with the steam.

15. In an elastic-fluid turbine, the combination of a wheel having rows of buckets, a casing therefor, intermediate buckets located between the rows of wheel-buckets, a base supporting the casing and containing a chamber into which the exhaust from the wheel discharges, a bearing which is mounted within the chamber, and means located outside of the base for adjusting the wheel-buckets relative to the intermediate buckets.

16. In a turbine, the combination of a casing, a revolving member mounted therein, a base containing a vacuum-chamber, a bearing which is entirely within the vacuum-chamber, and means for adjusting said bearing from a point outside of the base.

17. In an elastic-fluid turbine, the combination of a chambered base, a wheel-casing mounted thereon, a wheel having radial buckets located within the second casing and arranged to discharge its exhaust downward into the chamber in the base, a detachable disk situated above the wheel and supported by the wheel-casing, a nozzle for discharging fluid axially to the wheel, a second wheel situated above the first, a second detachable disk situated above the second wheel, and nozzles for discharging motive fluid axially to the second wheel.

18. In an elastic-fluid turbine, the combination of a base having an exhaust-chamber formed therein, a plurality of bucket-wheels situated one above the other, means for inclosing the wheels mounted on the base and opening into said chamber whereby the latter receives the exhaust from the last wheel, a disk for separating adjacent wheels, a disk acting as a cover for the wheel-inclosing means, segmental intermediate buckets located between the wheel-buckets, and expanding sectionalized nozzles delivering motive fluid to the wheel-buckets.

19. In an elastic-fluid turbine, the combination of a plurality of bucket-wheels mounted one above the other, means inclosing the wheels, a disk for separating adjacent wheels supported by said means, a plurality of sets of expanding sectionalized nozzles for each wheel, detachable intermediate buckets arranged in segmental groups and also supported by said means, a disk situated above the wheel-inclosing means and supported thereby, and a dynamo-support mounted on the upper end of the wheel-inclosing means.

20. In a staged turbine of the vertical type, the combination of a main shaft, a plurality of wheels mounted thereon, one above the other, the high-pressure wheel being located at the upper end and the low-pressure at the lower end, a chambered base which receives the exhaust from the low-pressure wheel, a bearing for the lower end of the shaft that is mounted in the chamber, means for preventing oil from the bearing mingling with the exhaust in the chamber, and separate sets of nozzles which discharge jets of motive fluid to the high and low pressure wheels.

21. In an elastic-fluid turbine, the combination of a chambered base, a wheel-casing mounted thereon, a bucket-wheel, a disk which is supported by the wheel-casing and is provided with openings near the periphery, and sectionalized expanding nozzles for delivering fluid to the wheel which register with the openings in the disk.

22. As an article of manufacture, a turbine-base comprising a two-part structure having a chamber formed therein, the line of division being in a plane at right angles to the base, flanges formed on the adjacent faces of the parts whereby they are bolted together, a finished upper surface which acts as a support for the turbine parts, and supports for holding the base in position.

23. In a turbine, the combination of a two-part casing constituting a vacuum-chamber, the line of division of the casing being at right angles to the base, a revolving member, and a casing which surrounds the revolving member and is secured to the two-part casing.

24. In a turbine, the combination of a base having a finished face, a casing mounted thereon having openings, intermediate buckets mounted in the openings, and a revolving bucket-wheel in operative relation to the intermediate buckets.

25. In a turbine, the combination of a base, a casing mounted thereon having openings in the upper face, and nozzles which are mounted in the openings.

26. In a turbine, the combination of a base, a casing mounted thereon having openings formed therein of different characters, intermediate buckets mounted in the openings of one character, and nozzles mounted in the openings of another character.

27. In a turbine, the combination of a base, a casing mounted thereon comprising a casing which rests on the base, and a disk having nozzle-openings near its periphery, and nozzles mounted in the openings.

28. In a turbine, the combination of a disk having openings near the periphery, a casing which is clamped thereto and is also provided with openings, a bucket-wheel, a second disk which is mounted on the casing and is also provided with openings, intermediate buckets for the openings, and nozzles for the openings in the second disk.

29. In an elastic-fluid turbine, the combination of a base containing a chamber, a casing situated above and supported by the base and having openings in its upper face, and sectionalized expanding-nozzles which are supported by the casing and register with said openings.

30. In a turbine having two or more stages, the combination of a casing for each stage, standards for uniting the casings, which standards also serve to convey the motive fluid, and valves which are mounted in the standards.

31. In a turbine, the combination of a base, a casing for the last stage mounted on the base, and a casing for the preceding stage mounted on the casing of the last stage.

32. In a turbine having more than one stage, the combination of a base, a casing for the last stage mounted on the base, a casing for the preceding stage, standards extending between one stage-casing to the other for securing them in place, and passages formed in the standards for carrying the motive fluid from one casing to another.

33. In a turbine, the combination of a base containing a chamber, a wheel-casing which is mounted on the base and is closed to the atmosphere but opens directly into the chamber in the base, a wheel which is mounted in the casing and freely delivers the motive fluid to the chamber, a shaft, a step-bearing therefor located within the chamber, means for preventing the lubricant supplied to the bearing from mingling with the exhaust, and means external to the casing for adjusting the vertical height of the wheel.

34. In a turbine, the combination of two or more casings, each containing a wheel, with standards having top and bottom flanges which are bolted to the casings, the said standards each having a fluid-passage which is larger at one end than the other, and valves which are mounted in the enlarged end of the standards.

35. In a turbine, the combination of a casing, a cover for the casing having an opening formed therein, a removable valve-support which is secured to the outside of the cover and registers with the opening, and an expanding-nozzle that is carried by the valve-support.

36. In combination, a casing containing openings, detachable nozzles mounted in the openings, steam connections, and bolts which pass through the nozzles and steam connections for securing them to the casing.

37. In a turbine, the combination of a base, a casing mounted thereon, a second casing mounted above the first, standards located near the edge of the casings for uniting them, and a sleeve which surrounds the turbine-shaft and supports the casings at that point.

38. In a turbine, the combination of a casing, a cover having an opening formed near its periphery and a shoulder which engages the casing, a detachable support that registers with and covers the opening, and a nozzle that is secured to the support and is removable therewith.

39. In a turbine, the combination of a casing having an upwardly-extending hub, a second casing having a downwardly-extending hub, a shaft for the revolving member, and a support which surrounds said shaft.

40. In a turbine, the combination of a casing comprising a disk and rim for respectively supporting the nozzles and intermediates, and a disk located below the rim and provided with unrestricted openings, which openings are located adjacent to the nozzles and receive fluid therefrom.

41. In a turbine, the combination of a casing which incloses the bucket-wheel, steam connections, a dynamo-electric machine, and a casing therefor which is mounted on the turbine-casing and is provided with openings whereby the steam connections are rendered accessible.

42. In a turbine, the combination of a wheel-casing, a casing for a dynamo-electric machine mounted thereon and provided with flanges which are bolted to the wheel-casing, a shaft which is common to the turbine and dynamo, and a steady bearing mounted in the casing of the dynamo-electric machine.

43. In a turbine, the combination of a wheel having a solid body with an enlarged flange, a casing for the wheel comprising two disks which are separable with respect to each other and are in close proximity to the wheel-body, the object being to reduce the volume of the chamber formed thereby, intermediates, and a rim or ring which closes in the chamber and also supports the intermediates.

44. In a turbine, the combination of a wheel having a peripheral grooved flange with detachable buckets arranged in groups and mounted in said groove.

45. In a turbine, the combination of a wheel having a grooved peripheral flange, a plurality of detachable bucket-segments, each segment having a number of buckets formed integral therewith, and means for retaining the segments in place.

46. In a turbine, the combination of a wheel having a flange which extends parallel with its axis and is provided with a plurality of grooves, and detachable segments mounted in the grooves, each of said segments being provided with a plurality of integrally-formed buckets, the buckets in the several rows gradually increasing in depth.

47. In a turbine, the combination of a wheel having a grooved periphery, segmental bucket-carrying pieces mounted therein, bolts for retaining the segments, and a covering for each ring of buckets.

48. In a turbine, the combination of a flanged wheel, detachable segments each containing a plurality of integrally-formed buckets, and means passing through the flange for securing the segments to the wheel.

49. In an elastic-fluid turbine, the combination of a shell that is provided with an opening, a nozzle which is situated in said opening, a valve-support which is secured to the outside of the shell at a point adjacent to the opening, means for securing the nozzle to the valve-support, and a valve located within the support for regulating the action of the nozzle.

50. In an elastic-fluid turbine, the combination of a wheel having grooves formed therein which assist in holding and alining the buckets, detachable segments mounted in the grooves and provided with buckets, the segments being separated in the direction of flow, means for attaching the segments to the wheel, and intermediate buckets located between the wheel-buckets and serving to reverse the direction of the motive fluid as it passes from one bucket in a segment to another.

51. In a turbine, the combination of a wheel or support having buckets mounted thereon, said buckets being provided with segmental bases or supports arranged end to end, each base or support being integral with and common to a plurality of buckets, segmental covers for the buckets arranged end to end, means for securing the covers in place, and devices for separately securing the bucket-segments so that they can be individually applied to and removed from the wheel or support.

In witness whereof I have hereunto set my hand.

WILLIAM L. R. EMMET.

Witnesses:
　ALEXANDER F. MACDONALD,
　BENJAMIN B. HULL.